(12) United States Patent
Somma

(10) Patent No.: US 11,834,273 B2
(45) Date of Patent: Dec. 5, 2023

(54) STAIR ROLLER DEVICE AND SYSTEM FOR MOVING LARGE ITEMS ON A STAIRWAY

(71) Applicant: Pasquale V. Somma, North Haven, CT (US)

(72) Inventor: Pasquale V. Somma, North Haven, CT (US)

(*) Notice: Subject to any disclaimer, the term of this patent is extended or adjusted under 35 U.S.C. 154(b) by 0 days.

(21) Appl. No.: 17/940,588

(22) Filed: Sep. 8, 2022

(65) Prior Publication Data

US 2023/0115717 A1    Apr. 13, 2023

Related U.S. Application Data

(60) Provisional application No. 63/255,174, filed on Oct. 13, 2021.

(51) Int. Cl.
*B65G 13/11* (2006.01)

(52) U.S. Cl.
CPC .................... *B65G 13/11* (2013.01)

(58) Field of Classification Search
CPC ..................................... B65G 13/11
USPC ......................................... 193/35 R
See application file for complete search history.

(56) References Cited

U.S. PATENT DOCUMENTS

| | | | | |
|---|---|---|---|---|
| 2,989,163 A | * | 6/1961 | O'Donnell ............. | B65G 69/30 193/41 |
| 3,796,429 A | * | 3/1974 | Johnston ................ | A63G 21/00 104/69 |
| 4,681,203 A | * | 7/1987 | Kornylak ............... | B65G 13/11 193/35 R |
| 6,401,901 B1 | * | 6/2002 | Bracken ............... | B65G 11/023 193/38 |
| 6,439,544 B1 | | 8/2002 | Rosenberg | |
| 7,000,753 B2 | * | 2/2006 | Cavallaro, Jr. ...... | B65G 11/183 193/33 |
| 8,146,713 B2 | * | 4/2012 | Rosenthal ............... | B66B 9/083 414/595 |
| 8,332,981 B2 | * | 12/2012 | Woo ....................... | E04F 11/002 193/38 |
| 8,468,632 B1 | * | 6/2013 | Ricci ..................... | E01D 15/124 193/41 |
| 8,602,196 B1 | * | 12/2013 | Patel ......................... | B62B 5/02 193/35 R |

(Continued)

FOREIGN PATENT DOCUMENTS

| | | |
|---|---|---|
| EP | 1187787 B1 | 9/2003 |
| WO | WO2018/092125 | 5/2018 |

OTHER PUBLICATIONS

US 2014/0209430 A1, Tanner, Jul. 31, 2014.*

*Primary Examiner* — Douglas A Hess
(74) *Attorney, Agent, or Firm* — Michael A. Blake

(57) ABSTRACT

A stair roller device comprising: a first rail; a second rail, the second rail parallel to the first rail; a top cross member fixedly attached to the first rail and second rail at or near the top of the first and second rails; at least one other cross members fixedly attached to the first rail and second rail and below the top cross member; a plurality of wheels on the top side of the first rail and the top side of the second rail, a horizontal extending member extending at an acute angle from the bottom side of the top cross member, the horizontal extending member configured abut against a structure at or near the top of a set basement stairs to temporarily hold the stair roller device on the basement stairs.

13 Claims, 20 Drawing Sheets

(56) References Cited

U.S. PATENT DOCUMENTS

| | | | |
|---|---|---|---|
| 9,133,624 B2 * | 9/2015 | Danziger | E04F 11/1863 |
| 9,708,162 B2 * | 7/2017 | Fry | B66B 9/0853 |
| 10,294,077 B2 * | 5/2019 | MacDonald | B66B 9/083 |
| 10,787,342 B2 * | 9/2020 | Okonski | B66B 9/083 |
| 11,292,695 B2 * | 4/2022 | Eisenman | A61G 7/10 |
| 11,319,154 B1 * | 5/2022 | Kosik, Sr. | B65G 13/06 |
| 2007/0161460 A1 | 7/2007 | Katz | |

* cited by examiner

US 11,834,273 B2

STAIR ROLLER DEVICE AND SYSTEM FOR MOVING LARGE ITEMS ON A STAIRWAY

CROSS-REFERENCES

This patent application claims priority to provisional patent application No. 63/255,174, filed on Oct. 13, 2021, by Pasquale V. Somma and titled: "A Stair Roller Device and System for Moving Large Items on a Stairway" which provisional application is fully incorporated by reference herein.

TECHNICAL FIELD

The present invention relates generally to a stair roller device and system for removing a large item from a basement, and more particularly, to a stair roller device and system for removing an oil tank from a basement.

BACKGROUND

Oil tanks located in the basement of a home or business are large structures. When an oil tank has to be removed and/or replaced, many times it is a difficult struggle to carry the tank up the stairs of a basement. Sometimes there is not enough room for the movers and tank to maneuver up the stairs and the tank has to be cut into pieces to remove the tank from the basement. Other times the tank may just be too heavy and cumbersome for the movers to carry up the basement stairs, and thus the tank has to be cut into pieces to remove the tank. When the tank is cut into pieces, this takes additional time and increases the cost of tank replacement. Also, if there is residual oil in the tank, the oil may cause an environmental hazard when the tank is cut into pieces.

Thus there is a need for a stair roller device and system for moving large items on a stairway that overcomes the above listed and other disadvantages.

SUMMARY OF THE INVENTION

The invention relates to a stair roller device comprising: a first rail with a top side and a bottom side; a second rail with a top side and a bottom side, the second rail parallel to the first rail; a top cross member fixedly attached to the first rail and second rail at or near the top of the first and second rails, the top cross member having a top side and a bottom side; at least one other cross members fixedly attached to the first rail and second rail and below the top cross member; a plurality of wheels on the top side of the first rail, a plurality of wheels on the top side of the second rail, a horizontal extending member extending at an acute angle from the bottom side of the top cross member, the horizontal extending member configured abut against a structure at or near the top of a set basement stairs to temporarily hold the stair roller device on the basement stairs; where the stair roller device is configured to temporarily and securely lay on basement stairs such that a cumbersome item can be rolled up the stair roller device via the plurality of wheels up and out of a basement.

The invention also relates to a stair roller system comprising: a first rail with a top side and a bottom side; a second rail with a top side and a bottom side, the second rail parallel to the first rail; a top cross member fixedly attached to the first rail and second rail at or near the top of the first and second rails, the top cross member having a top side and a bottom side; at least one other cross members fixedly attached to the first rail and second rail and below the top cross member; a plurality of wheels on the top side of the first rail, a plurality of wheels on the top side of the second rail, a horizontal extending member extending at an acute angle from the bottom side of the top cross member, the horizontal extending member configured abut against a structure at or near the top of a set basement stairs to temporarily hold the stair roller device on the basement stairs; a rear wall fixedly attached to the horizontal extending member and the bottom side of the top cross member, the rear wall, horizontal extending member, and bottom side of the top cross member forming a triangular box; a vertical slot in the horizontal extending member; an elongated winch member with a winch at the distal end; a shank pinned within the triangular box, such that the shank can rotate or pivot within the vertical slot, the shank configured to removeably couple to the elongated winch member at a proximal end of the elongated winch member; a strap in operable communication with the winch and configured to removeably attach to an oil tank; and where the stair roller device is configured to temporarily and securely lay on basement stairs such that a cumbersome item can be rolled up the stair roller device via the plurality of wheels up and out of a basement.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION OF THE INVENTION

Figure 1:
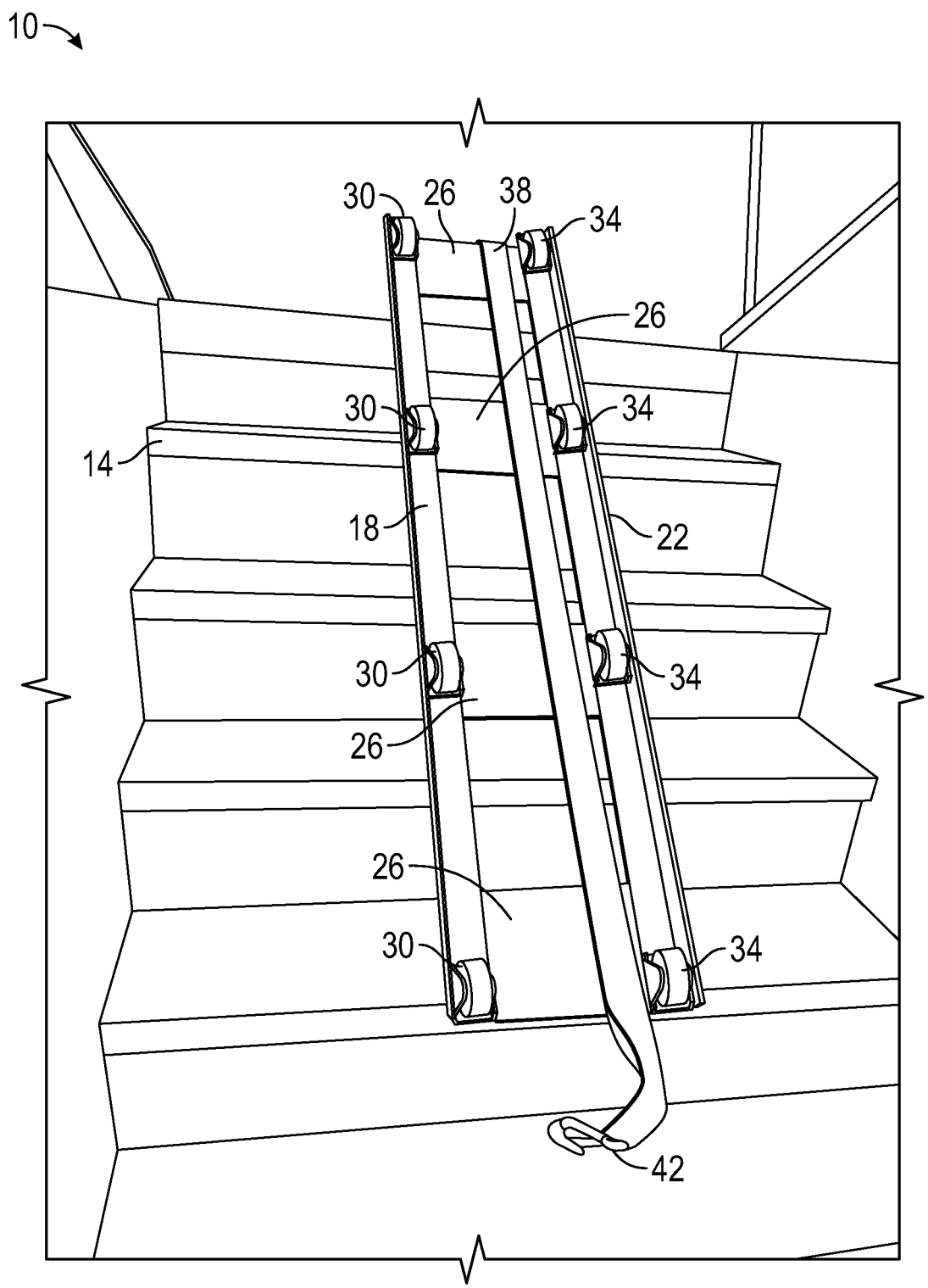
FIG. 1 is a front view of the stair roller device on a stair.

FIG. 1 shows the stair roller device 10 removeably installed on a set of basement stairs 14. The device has two rails 18, 22. The device has a plurality of cross-members 26 that hold the rails 18, 22 in place with respect to one another. Located on the top side of the first rail 18 (on the side opposite of the stairs), are a plurality of rollers or wheels 30. Located on the top side of the second rail 22, are also a plurality of rollers or wheels 34. In one embodiment, the cross-members 26 may be located on the rails 18, 22 directly behind the wheels 30, 34 to provide support for the wheels 30, 34 being attached to the rails 18, 22. Also seen in this view is a strap 38, with a hook 42 or other attachment means at one end of the strap 38. The strap 38 may be attached to a hand winch located at the top of the roller device 10.

Figure 2:
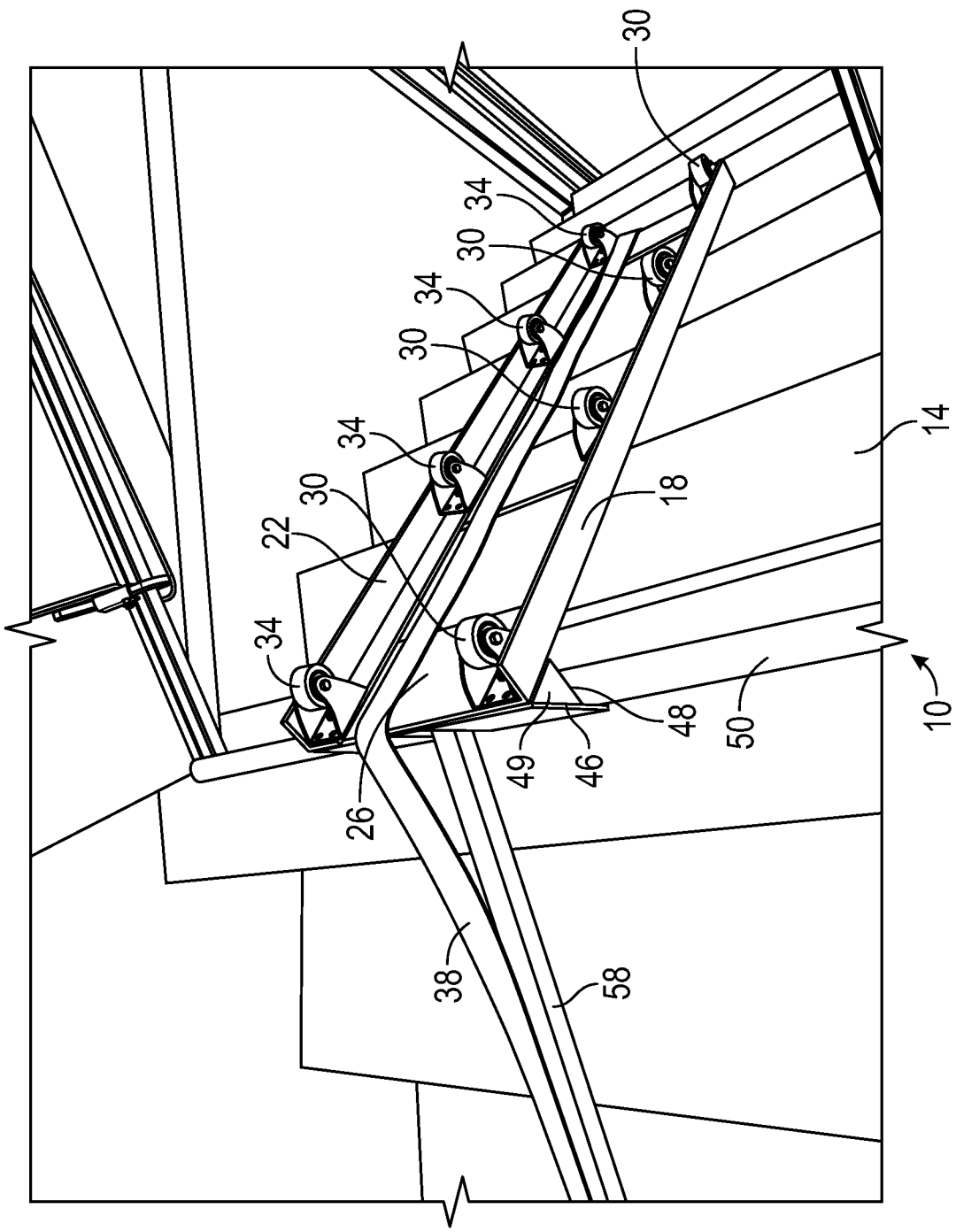
FIG. 2 is a perspective top view of the stair roller device.

FIG. 2 shows the stair roller device 10 removeably installed on a set of basement stairs 14 from a view at the top of the stairs 14. Attached to the underside of the top cross member 26 is a horizontal extending member 46, that extends from the underside of the top cross member 26 at an acute angle, and is configured to temporarily hold the stair roller device 10 at the top of stairs by abutting against a ridge located at the top of the basement stairs, or by the bottom of the storm door 50. The horizontal extending member 46 has a vertical slot 54 (not seen in this view) from which an elongated winch member 58 moveably extends from. The horizontal extending member 46, the cross member 26, and a rear wall 48 may form a triangular box 49. The triangular box 49 prevents horizontal extending member 46 from being pulled back towards the basement by the weight of the oil tank. The triangular box 49 may also or instead abut against a ridge located at the top of the basement stairs, or by the bottom of the storm door 50. The wheels 30, 34 may be oriented such that when an oil tank is placed on the wheels 30, 34, the wheels are rotatable such that the oil tank can easily travel up or down the length of the rails 18, 22. In other words, the oil tank can ride along the wheels 30, 34 from the bottom of the stairs 14 up out of the basement to the top of the stairs 14. Also, each wheel 30, 34 has an axis of rotation. The axis of rotation of each wheel is generally about orthogonal to the length of the rails 18, 22. Orthogonal means perpendicular skew.

Figure 3:
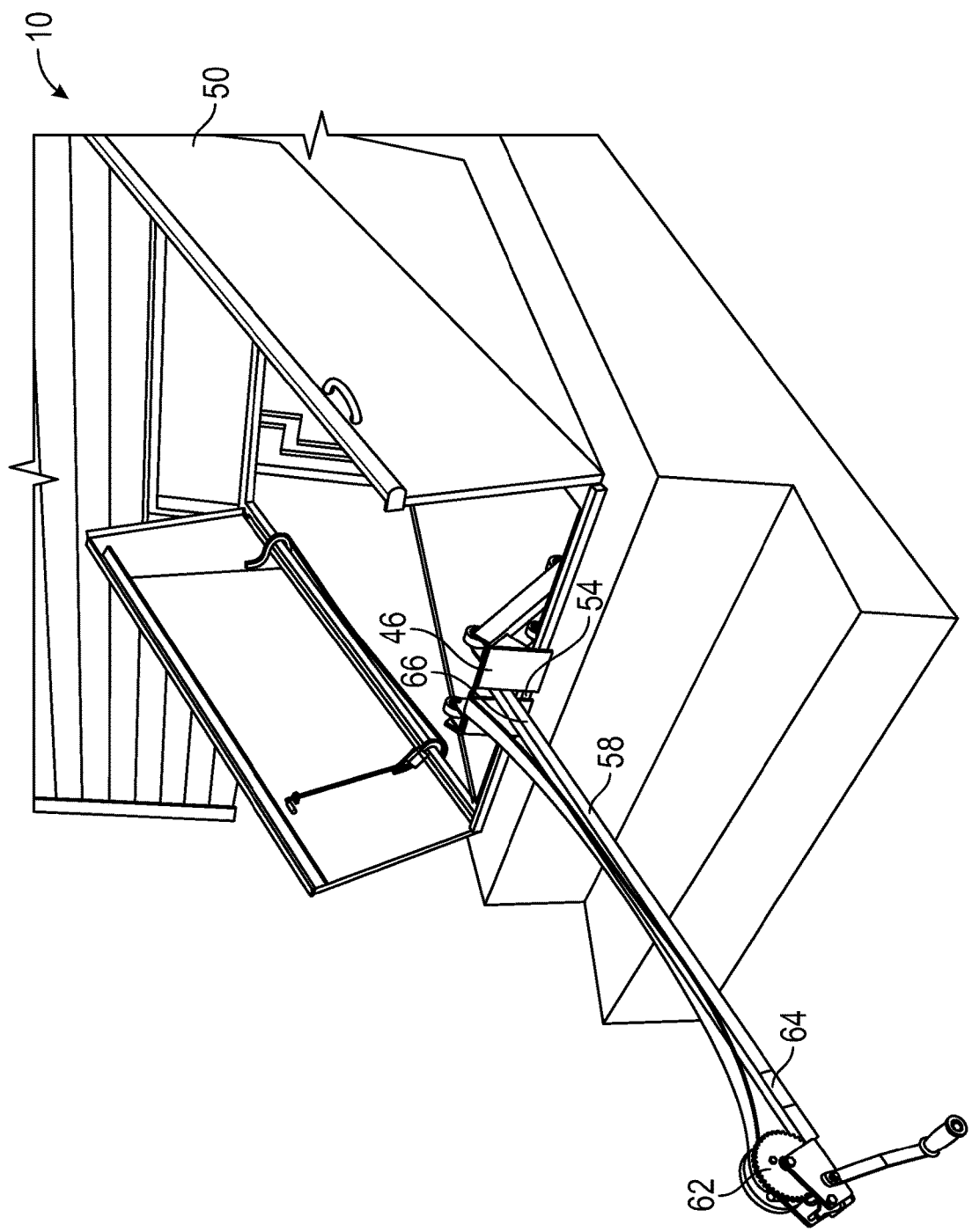
FIG. 3 is a view of the stair roller device showing the elongated winch member extended from the triangular box.

FIG. 3 shows the elongated winch member 58 extending out of the vertical slot 54 of the horizontal extending member 46. A hand winch 62 is removeably attached to a distal end 64 of the elongated winch member 58. The proximal end 66 of the elongated winch member 58 may have an elongated winch cross bar (not seen in this view) that is in horizontal orientation in FIG. 3. When the elongated winch member 58 is rotated about 90 degrees, then the elongated winch cross bar is in a vertical orientation, and the elongated winch member 58 and the elongated winch cross bar can be pulled completely out of the slot 54. In other embodiments, the hand winch 62 may be replaced by a powered winch, electric winch, hydraulic winch, or a battery powered winch.

Figure 4:
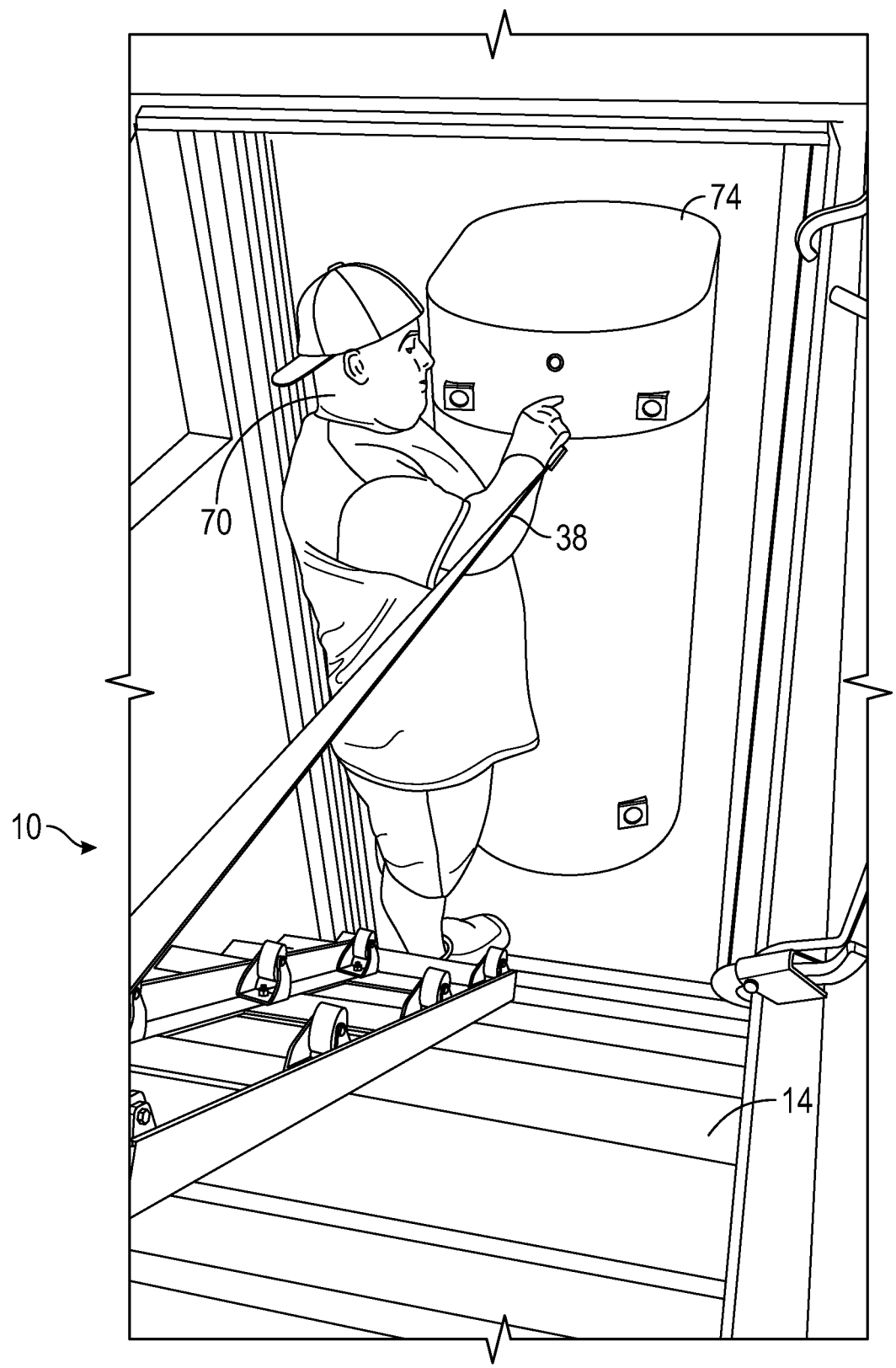
FIG. 4 shows a worker readying an oil tank to be transported up the stair roller device.

FIG. 4 shows a worker 70 attaching the strap 38 to an oil tank 74 in a basement. The stair roller device 10 is already removeably installed on the stairs 14.

Figure 5:
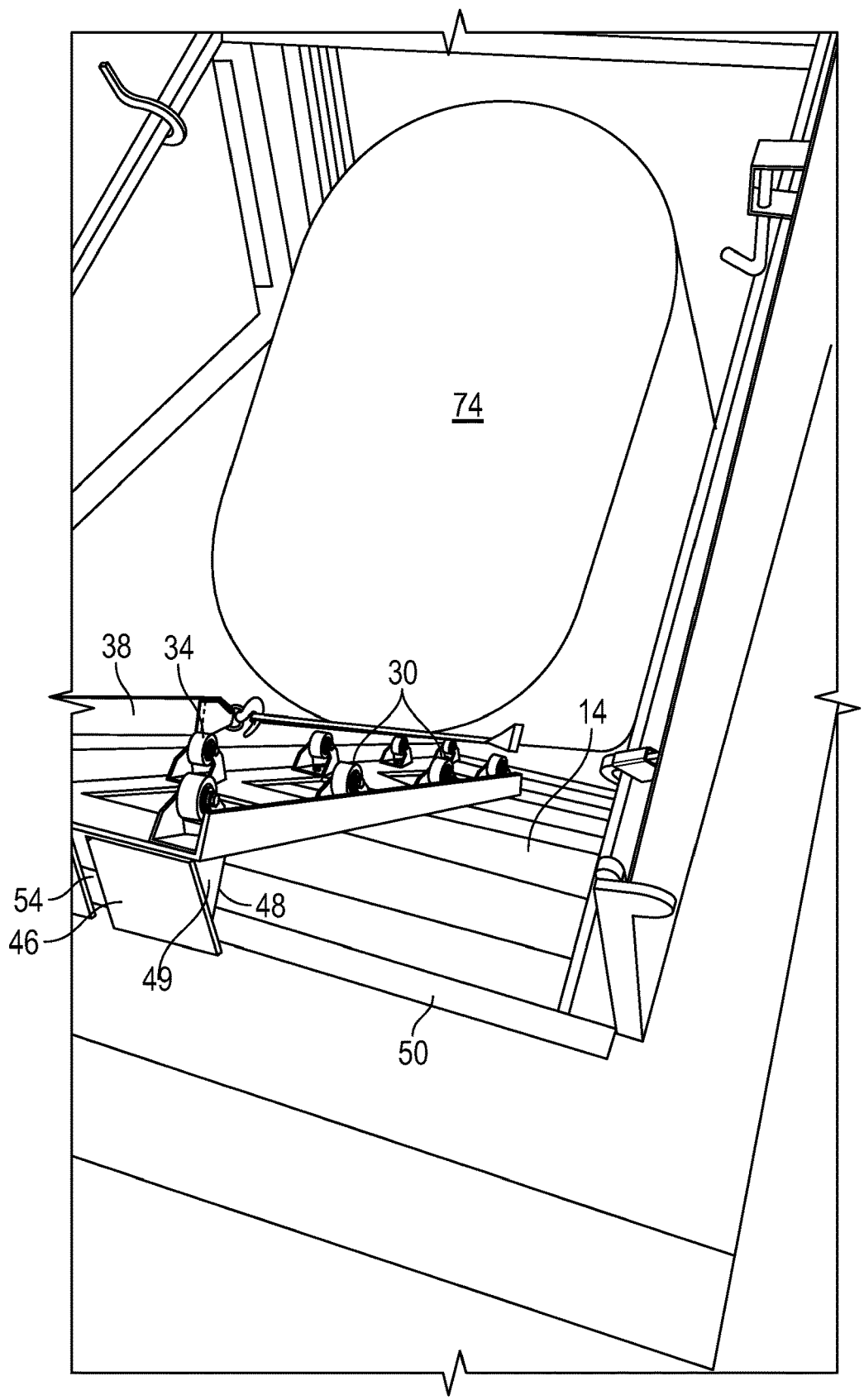
FIG. 5 shows an oil tank being winched up the stair roller device.

FIG. 5 shows the strap 38 pulling the oil tank 74 up the rollers or wheels 30, 34 of the stair roller device 10.

Figure 6:
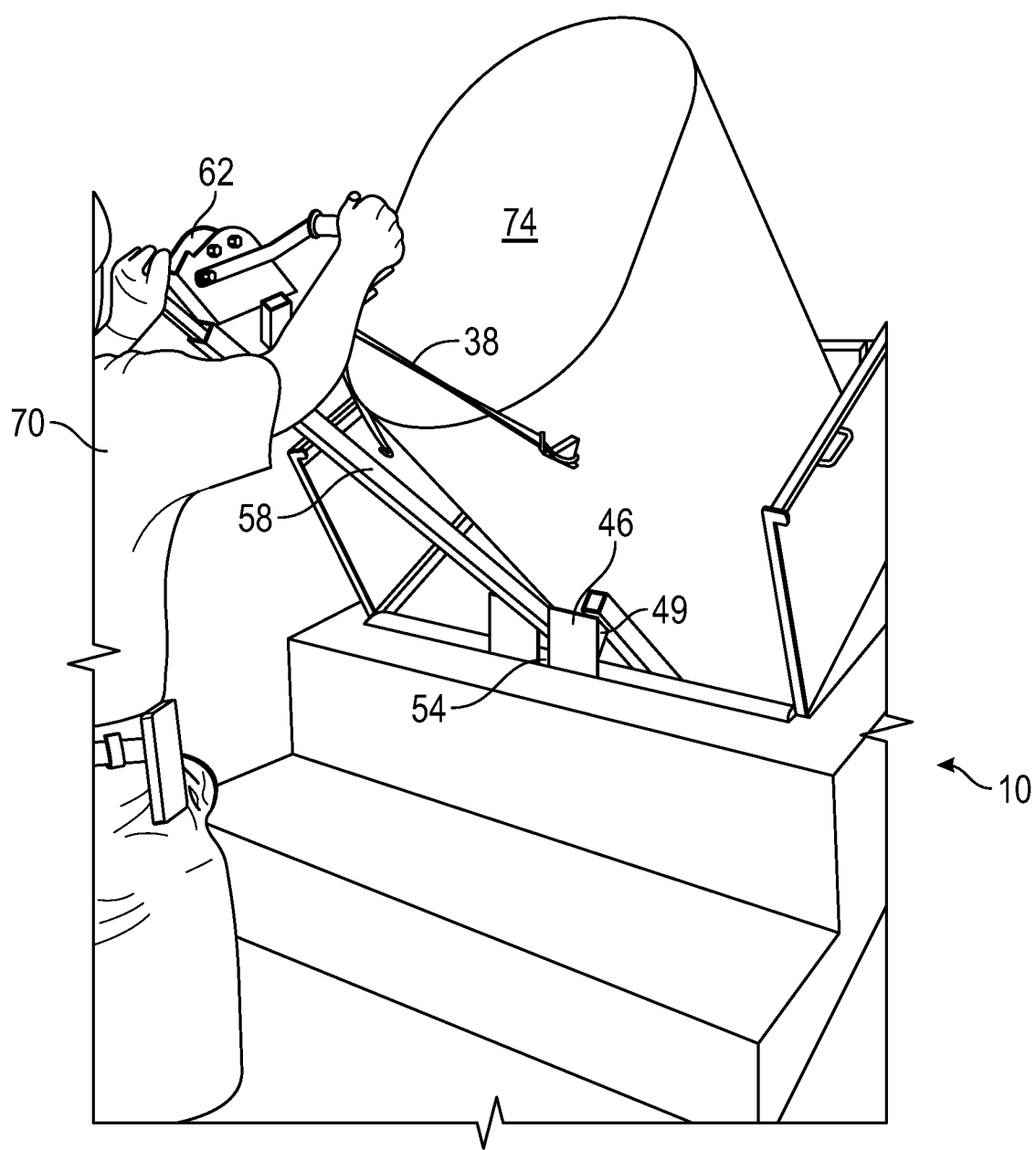
FIG. 6 shows an oil tank emerging from a basement on the stair roller device.

FIG. 6 shows a worker 70 using the hand winch 62 to pull the strap 38 and oil tank 74 up the stair roller device 10. In this view, it can be seen that despite the weight of the oil tank 74 pulling down on the hand winch 62 and elongated winch member 58, that the winch member 58 is constrained from being pulled down towards the basement by the triangular box 49.

Figure 7:
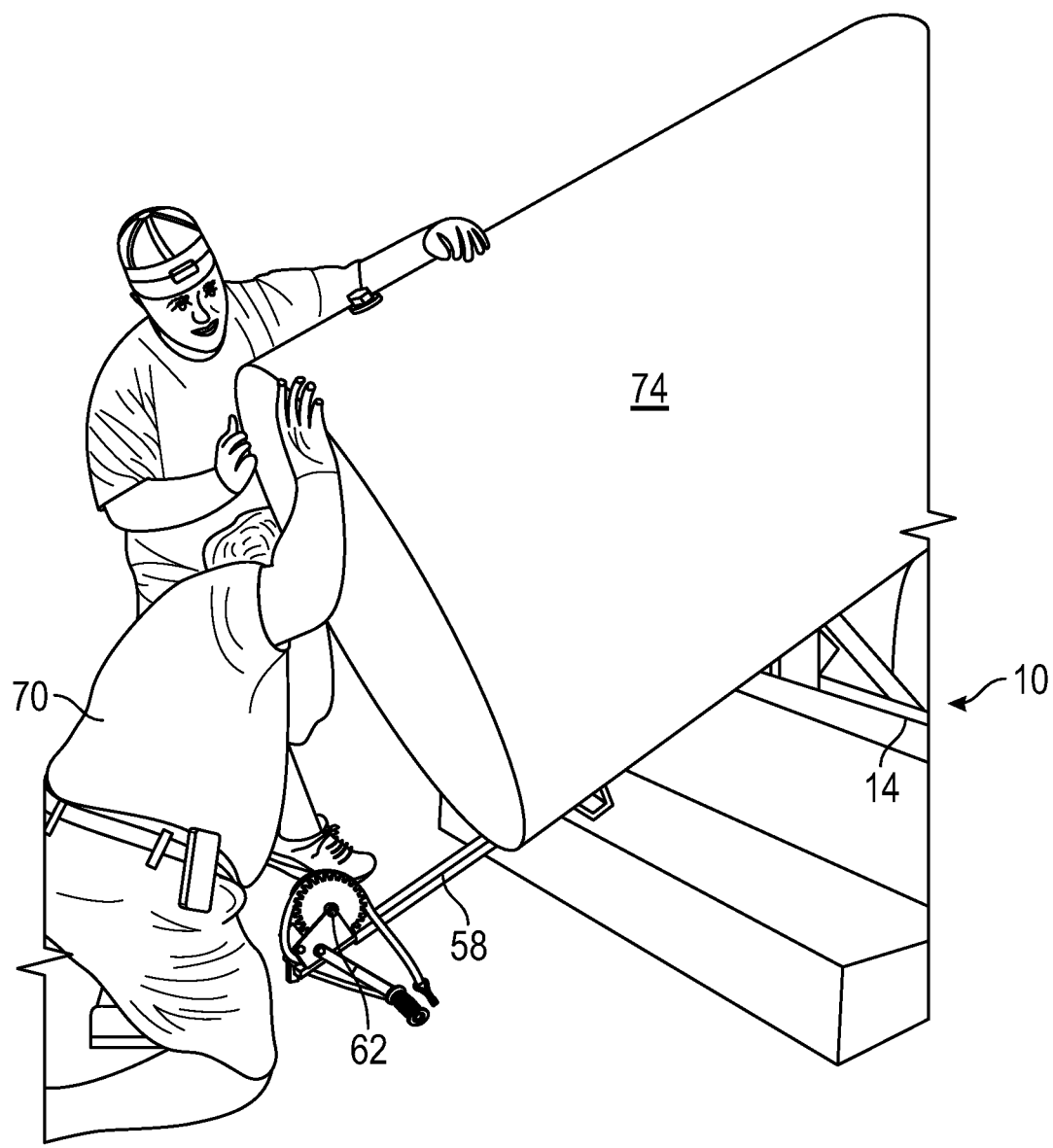
FIG. 7 shows the oil tank tipped down on the elongated winch member.

FIG. 7 shows the tank 74 being tilted down and out of the basement stairs 14. The elongated winch member 58 can pivot with respect to the slot 54 (not seen in this view) due to the elongated winch cross bar (not seen in this view) on the inside of the triangular box 49 (not seen in this view), and yet be constrained by the slot 54.

Figure 8:
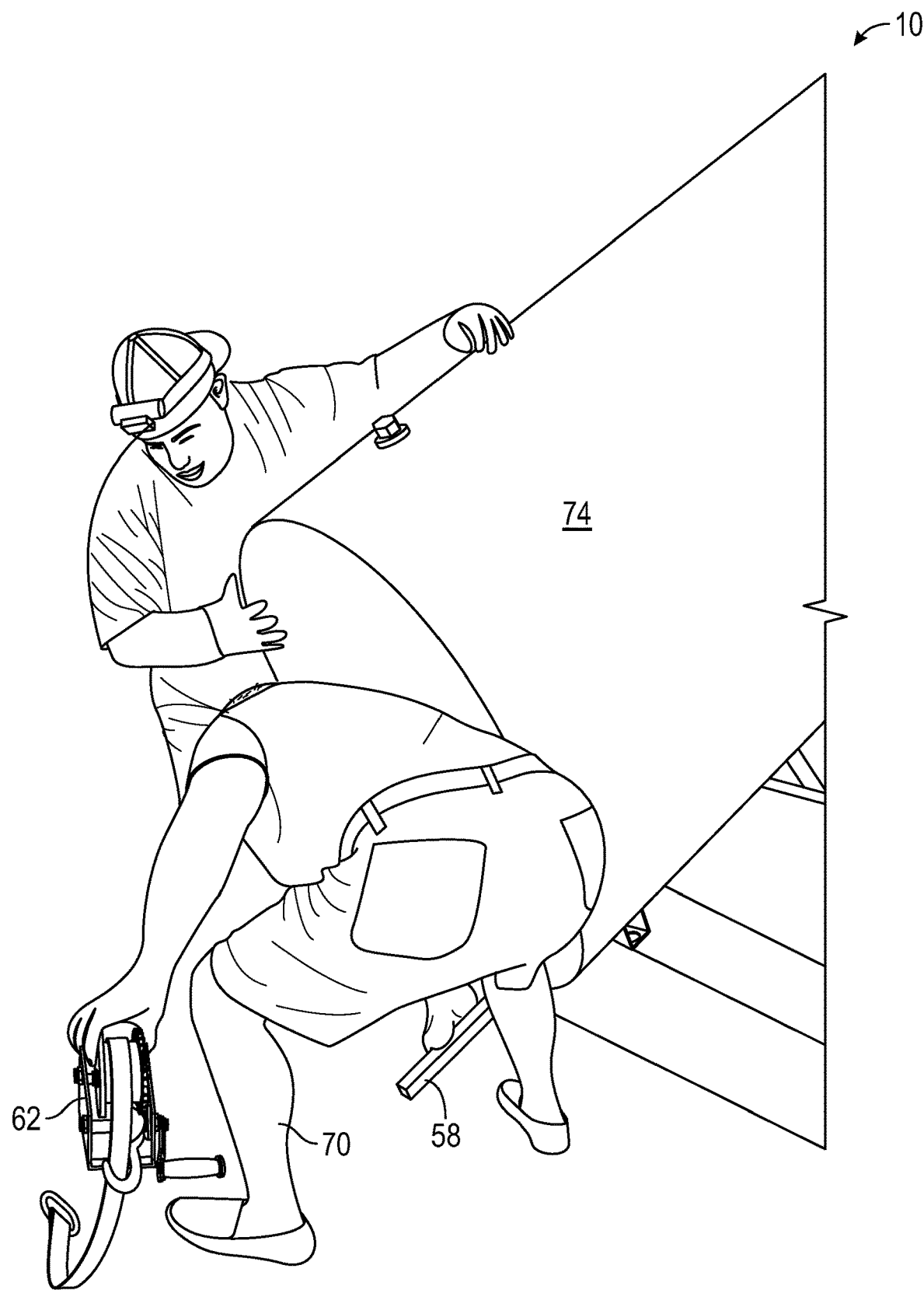
FIG. 8 shows the winch being removed from the elongated winch member.

FIG. 8 shows the hand winch 62 being removed from the elongated winch member 58; this allows the worker 70 to slide the oil tank 74 down the elongated winch member 58 without the hand winch 62 being in the way. Once the tank 74 is removed, the elongated winch member 58 can be rotated with respect to the vertical slot 54, and the elongated winch member 58 can be separated from the triangular box 49, to make the entire stair roller device 10 easier to store and transport.

Figure 9:
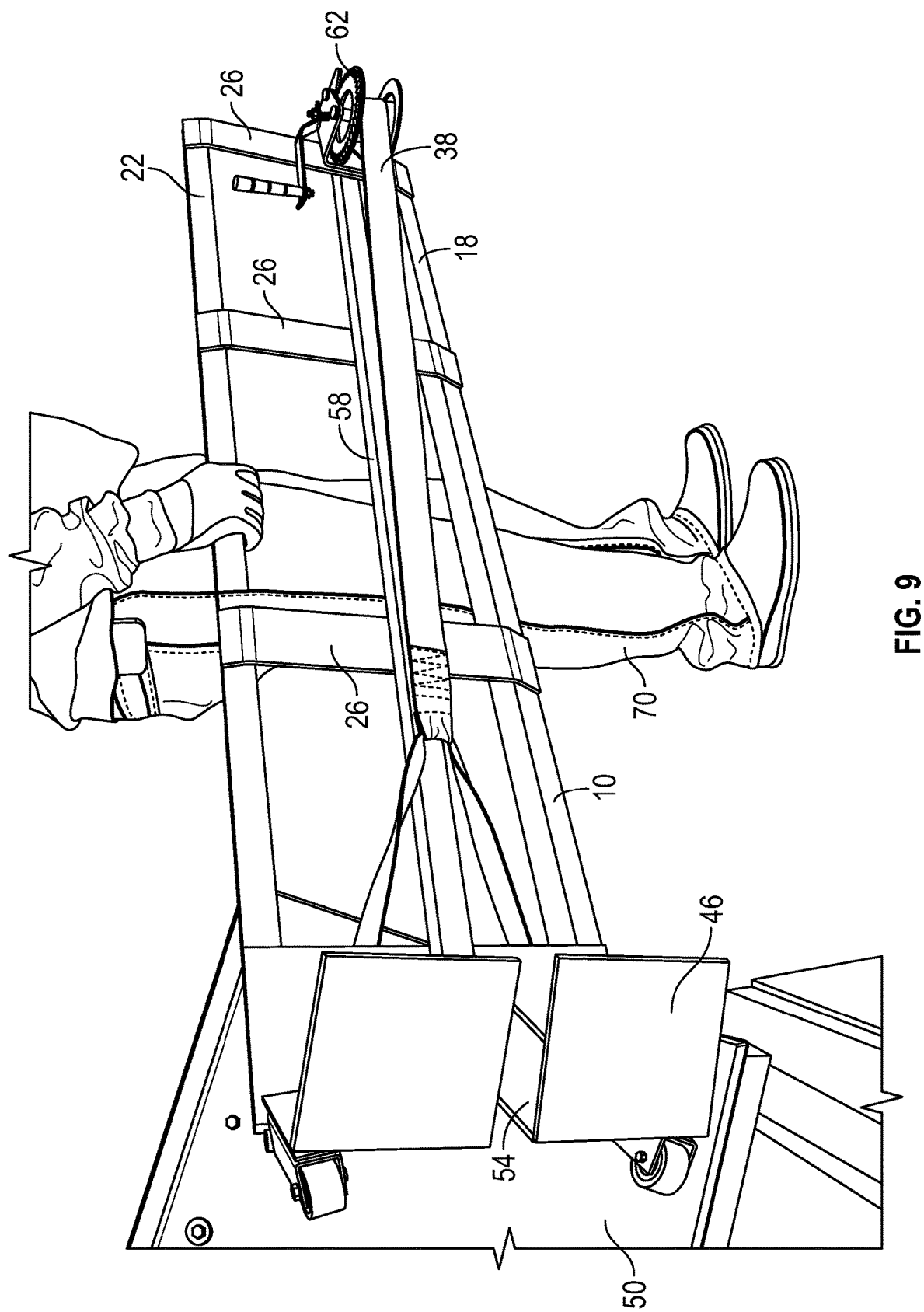
FIG. 9 shows a front perspective view of the stair roller device being carried.

FIG. 9 shows a back side view of the stair roller device 10 being carried by a worker 10.

Figure 10:
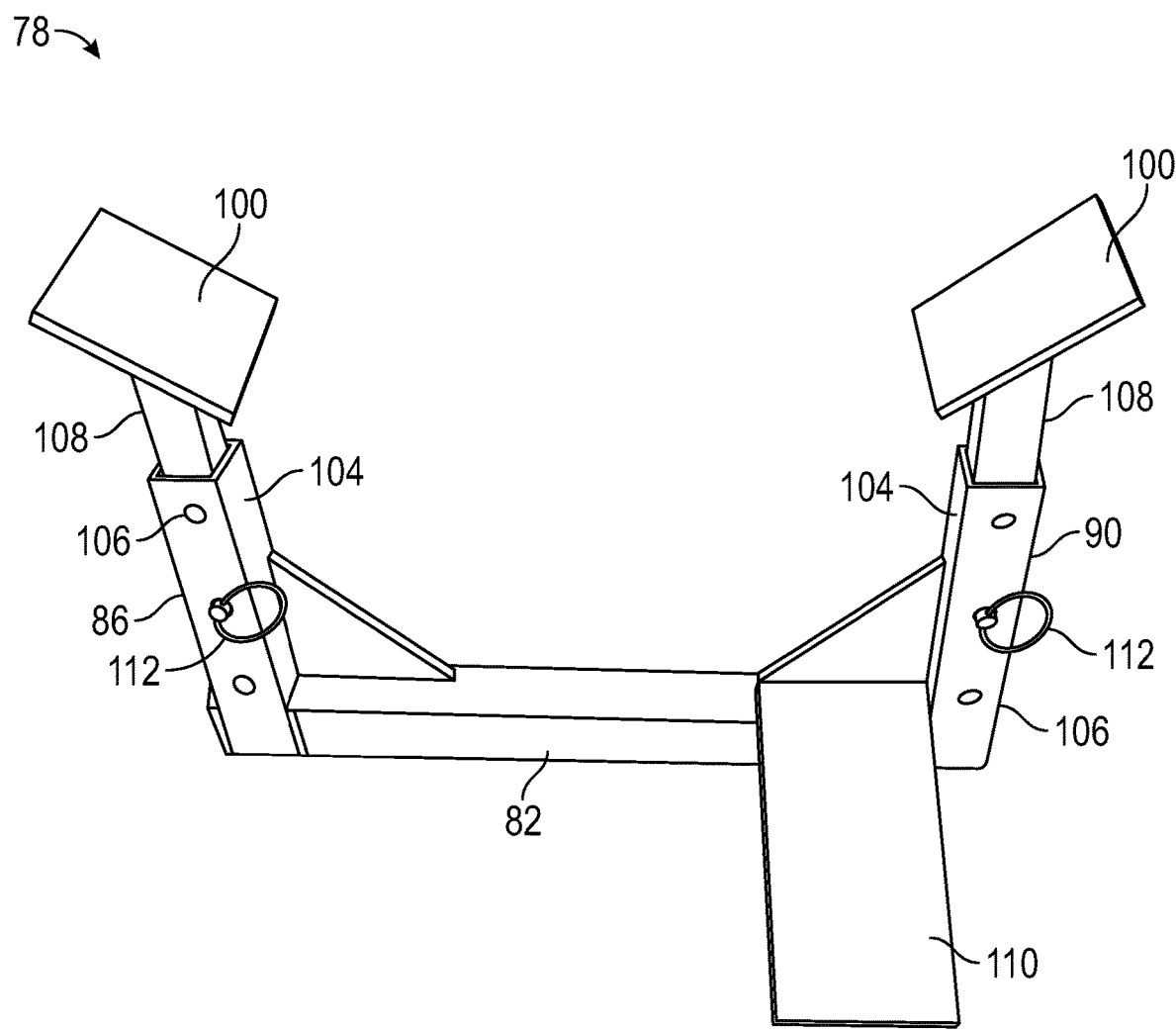
FIG. 10 shows a front perspective view of the kick stand.

FIG. 10 shows an optional kick stand 78. The kick stand 78 comprises a base 82 and a first adjustable support member 86 on a first end of the base 82, and a second adjustable support member 90 at a second end of the base 82. Each adjustable support member 86, 90 may have an angled support plate 100. The two support plates 100 are angled and configured to generally fit the curved surface of an oil tank 74. The adjustable support members 86, 90 may each comprise an outer member 104 with a plurality of holes 106, the outer member 104 fixedly attached to the base 82, and an inner member 108 configured to adjustably slide within the outer member 104, the inner member 108 also having one or more holes configured to align with the holes 106, such that one or more pins 112 may be used to lock the inner member 108 within the outer member 104 at a desired height of the entire adjustable support member 86, 90. The base 82 may also have a kick plate 110 fixedly attached to the base 82. The kick plate 110 extends away from the base 82 and the adjustable support member 86, 90 at about 90°, or about 60° to about 120°. In one use, the kick stand 78 may be laid near and/or below the elongated winch member 58 and the triangular box, with the kick plate away from the storm door, and the kick plate generally pointing up in the air, and the adjustable support members 86, 90 generally horizontal, and lying on the ground. When the oil tank 74 is nearly out of the basement and/or storm door, the worker can step on the pick plate 110 so that the kick plate 110 is now adjacent and abutting the ground and the adjustable support members are generally vertical with the angled support plates 100 ready to accept and support the weight of the oil tank 74.

Figure 11:
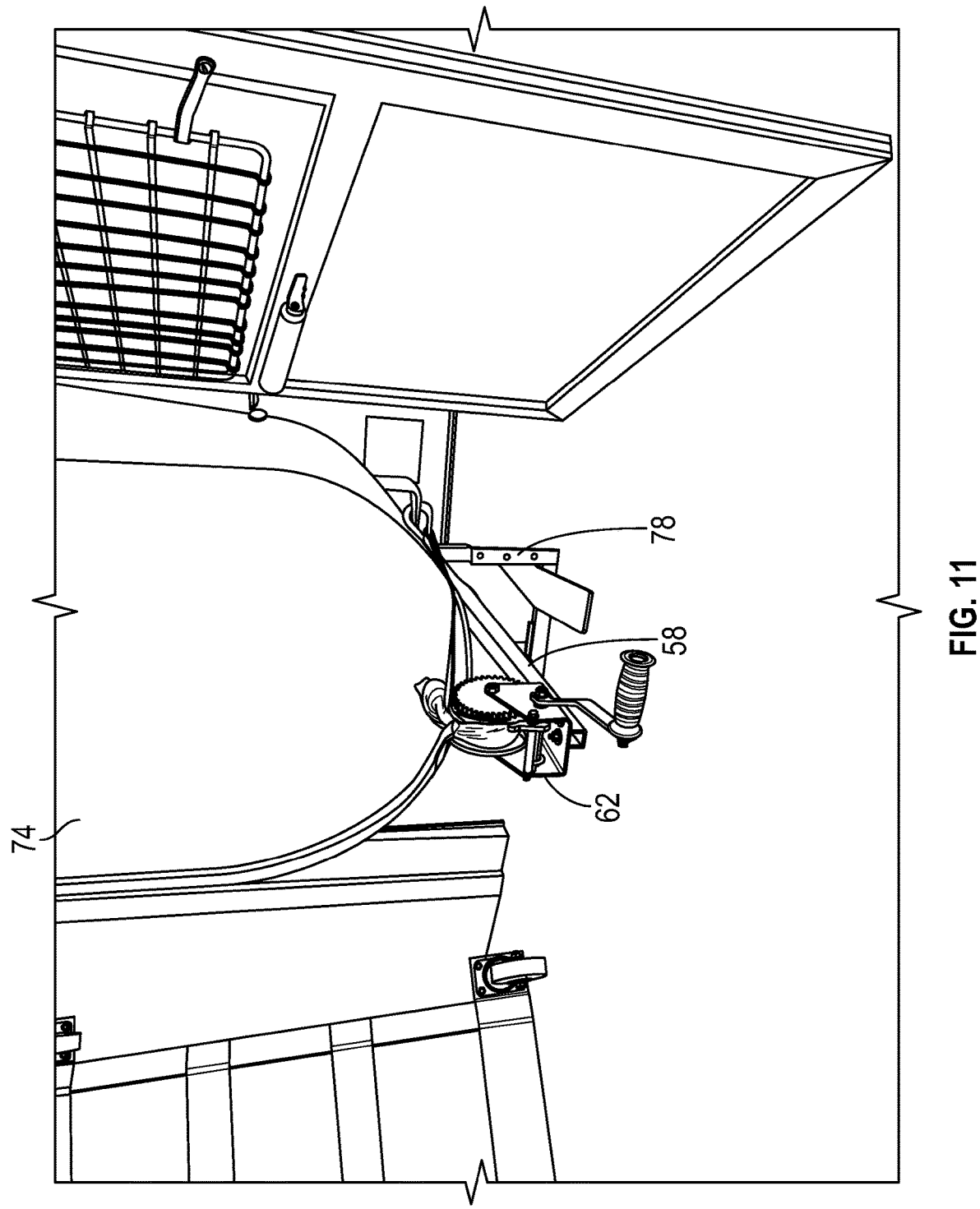
FIG. 11 shows a view of the kick stand in user under an oil tank.

FIG. 11 shows the kick stand 78 supporting an oil tank 74, and underneath the elongated winch member 58 and near the hand winch 62.

Figure 12:
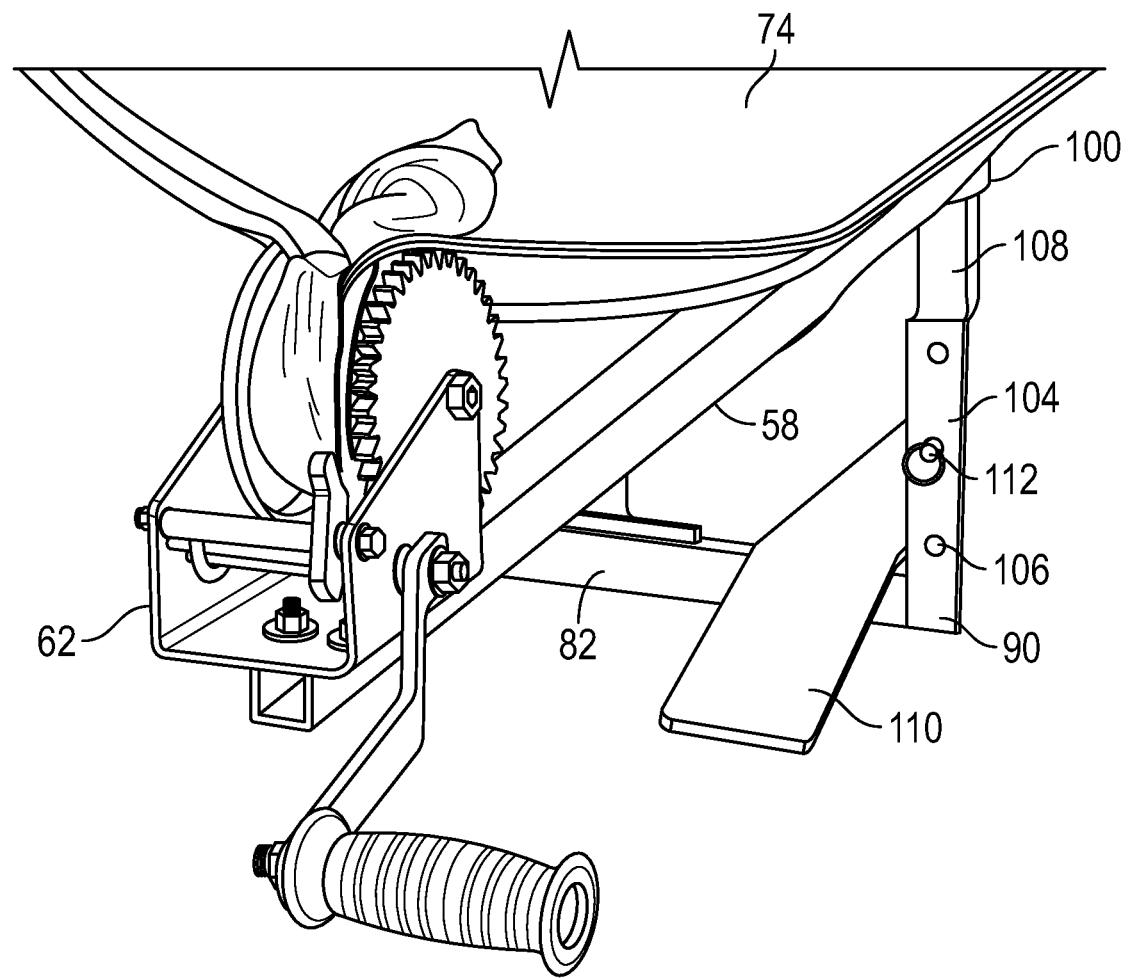
FIG. 12 shows a close up view of the kick stand supporting an oil tank.

FIG. 12 shows a close up view of the kick stand supporting an oil tank 74, and underneath the elongated winch member 58 and near the hand winch 62.

Figure 13:
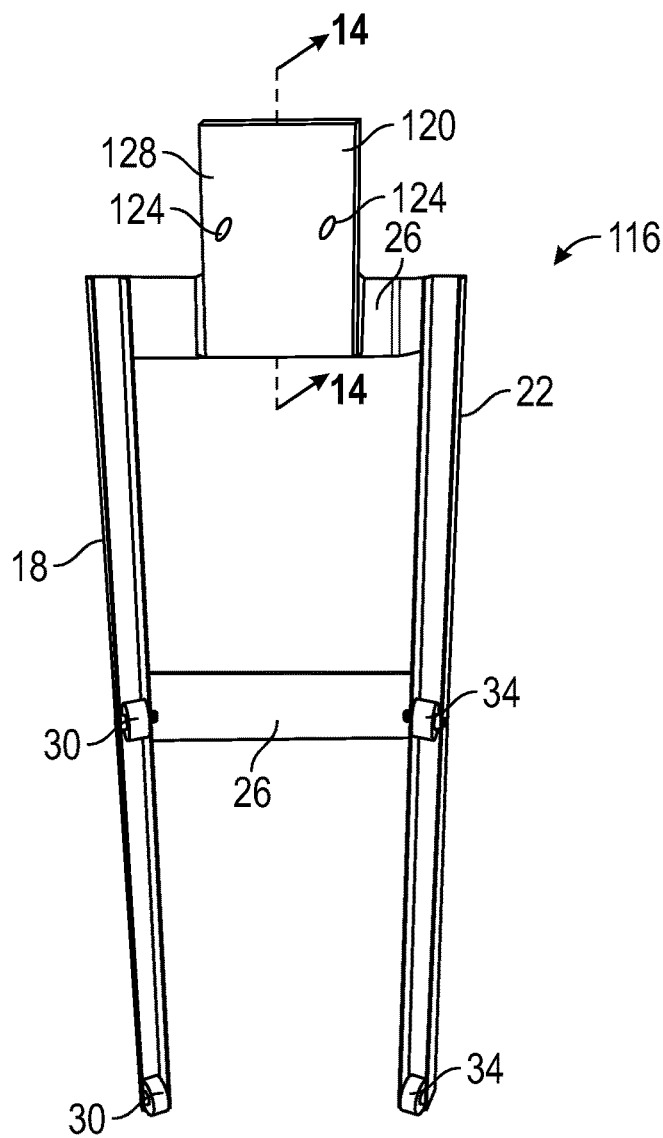
FIG. 13 shows a front view of an optional extender.

FIG. 13 shows a front view of an optional extender 116. The extender has two rails 18, 22. The device has a plurality of cross-members 26 that hold the rails 18, 22 in place with respect to one another. Located on the top side of the first rail 18 (on the side opposite of the stairs), are a plurality of rollers or wheels 30. Located on the top side of the second rail 22, are also a plurality of rollers or wheels 34. In one embodiment, the cross-members 26 may be located on the rails 18, 22 directly behind the wheels 30, 34 to provide support for the wheels 30, 34 being attached to the rails 18, 22. The extender also has a connector plate 120 fixedly attached to the top cross-member 26. The connector plate 120 may have two fasteners 124 located on the front 128 of the connector plate, the fasteners 124 extend out of the back of the connector plate 120. The connector plate 120 is used to attach to the bottom cross-member 26 of a stair roller device 10. The fasteners 124 act as a stop to prevent the bottom cross-member 26 from the stair roller device from separating from the connector plate 120.

Figure 14:
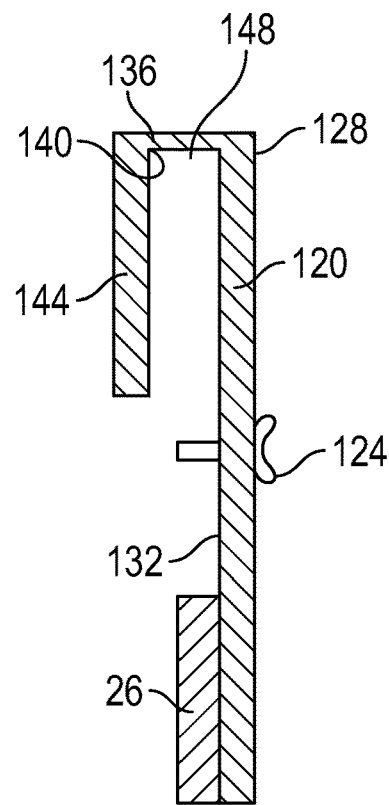
FIG. 14 shows a cross-sectional view of the connector plate.

FIG. 14 is a cross-sectional view of the connector plate 120. Extending generally orthogonally from the top of the back 132 of the connector plate 120 is a top member 136. Extending down from the rear 140 of the top member 136 is down member 144. The connector plate 120, top member 136, and down member 144 form a slot 148 for the cross-member 26 of the stair roller device 10 to slide into. Once the cross-member 26 is located in the slot, the fasteners 124 may be turned so the extend into the slot and prevent the cross-member 26 from sliding down out of the slot 148. In one embodiment, the fasteners 124 may be thumb screws.

Figure 15:
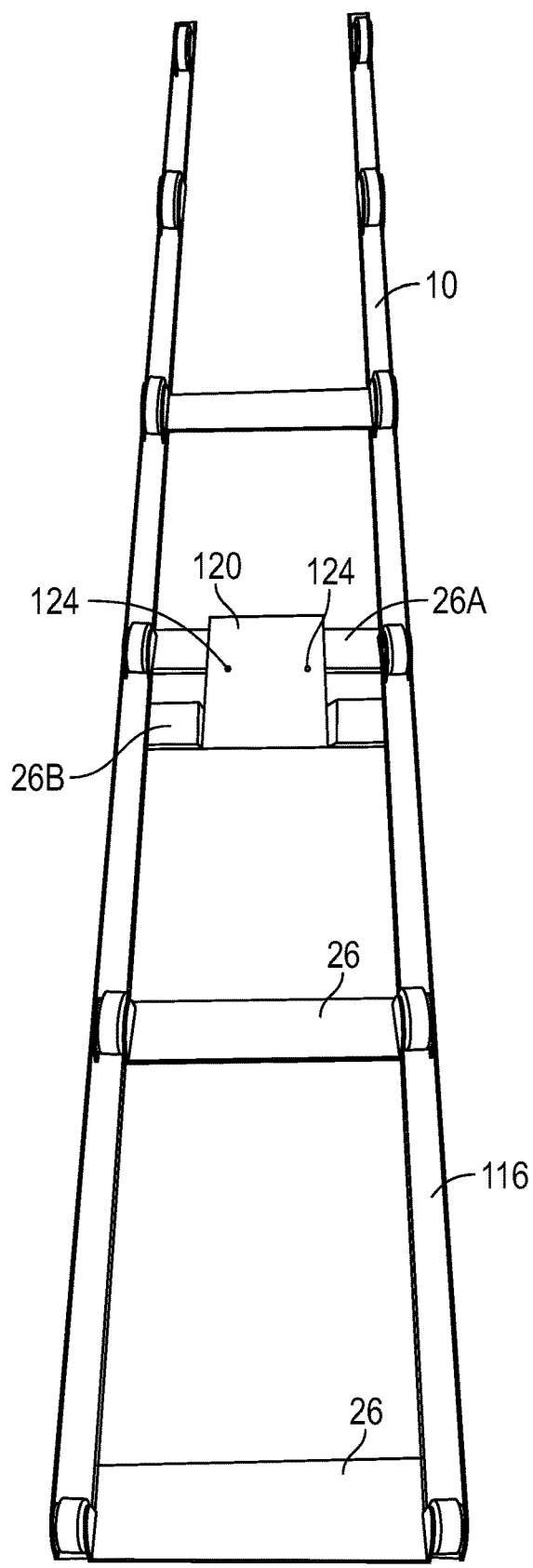
FIG. 15 shows the extender removeably attached to a stair roller device.

FIG. 15 shows the extender 116 removeably attached to a stair roller device 10. The connector plate 120 is removeably attached to the lower cross-member 26A of the stair roller device 10. The connector plate 120 is fixedly attached to the top cross-member 26B of the extender 116.

Figure 16:
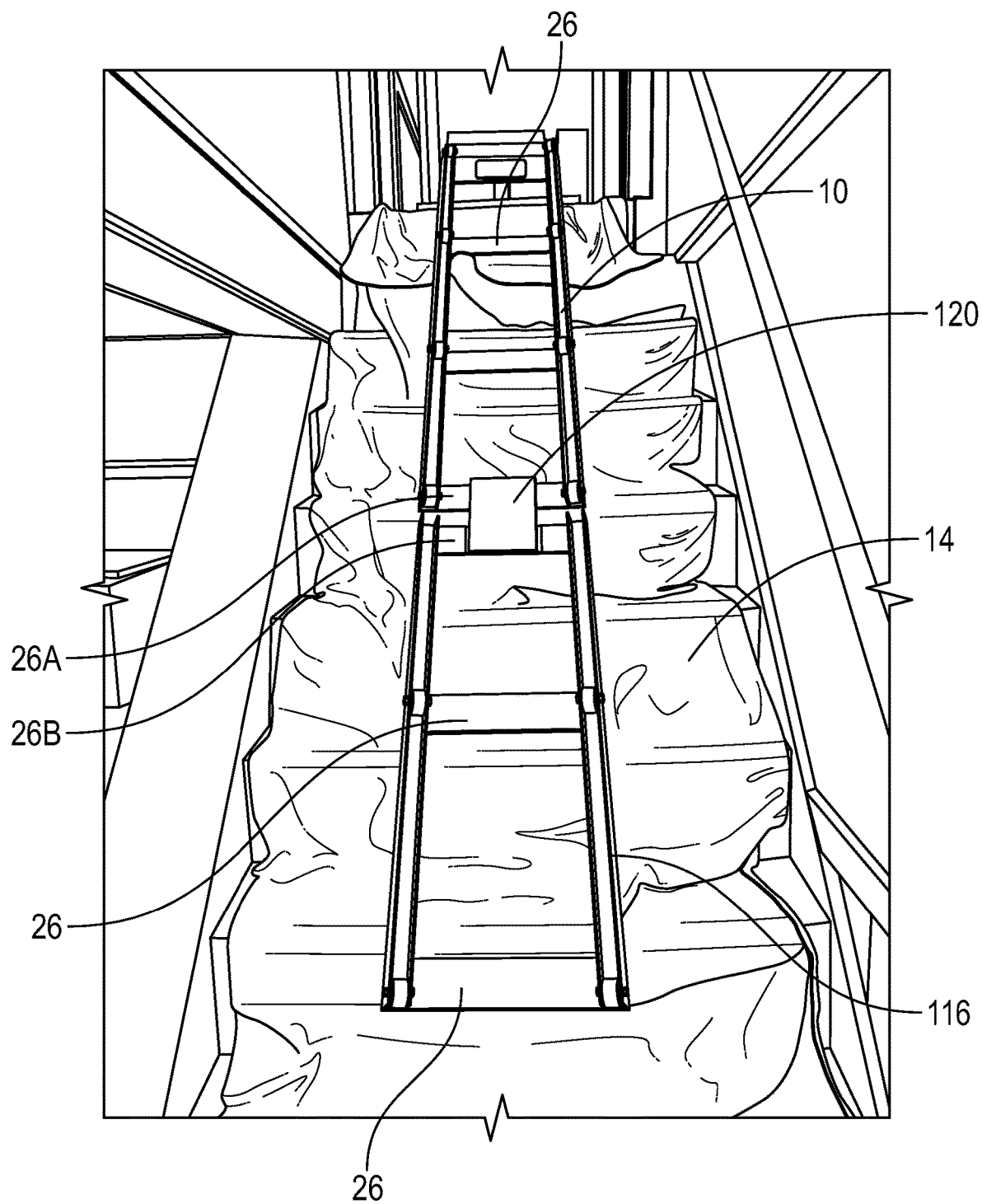
FIG. 16 shows a front view of the stair roller device attached to an extender with the stair roller device and extender placed on basement stairs.

FIG. 16 shows a front view of the stair roller device 10 attached to an extender 116, with the stair roller device 10 and extender 116 placed on basement stairs 14.

Figure 17:
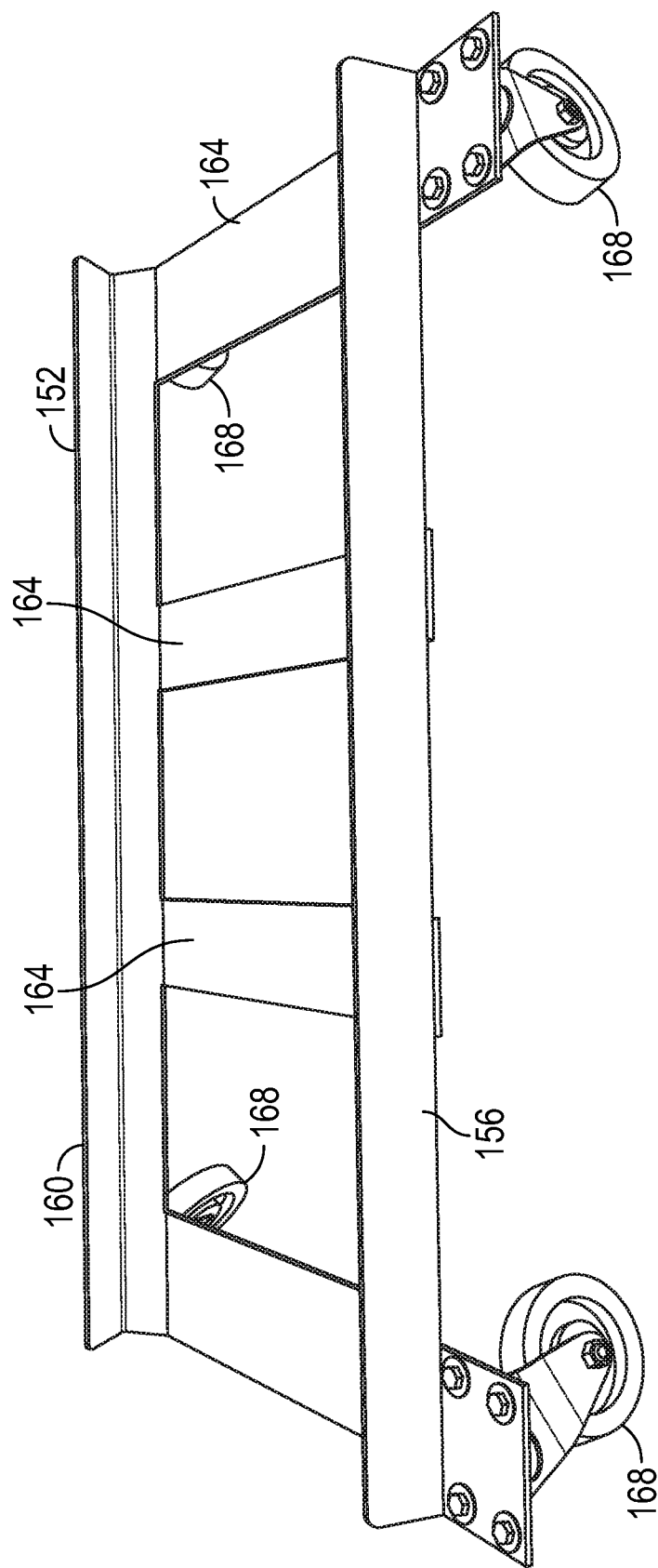
FIG. 17 shows a side perspective view of a low profile dolly.

FIG. 17 shows a side perspective view of a low profile dolly 152. The dolly comprises a first side rail 156 and a second side rail 160. A plurality of dolly cross-members 164 are attached to the side rails 156, 160. On the bottom side of the dolly are a plurality of wheels 168.

Figure 18:
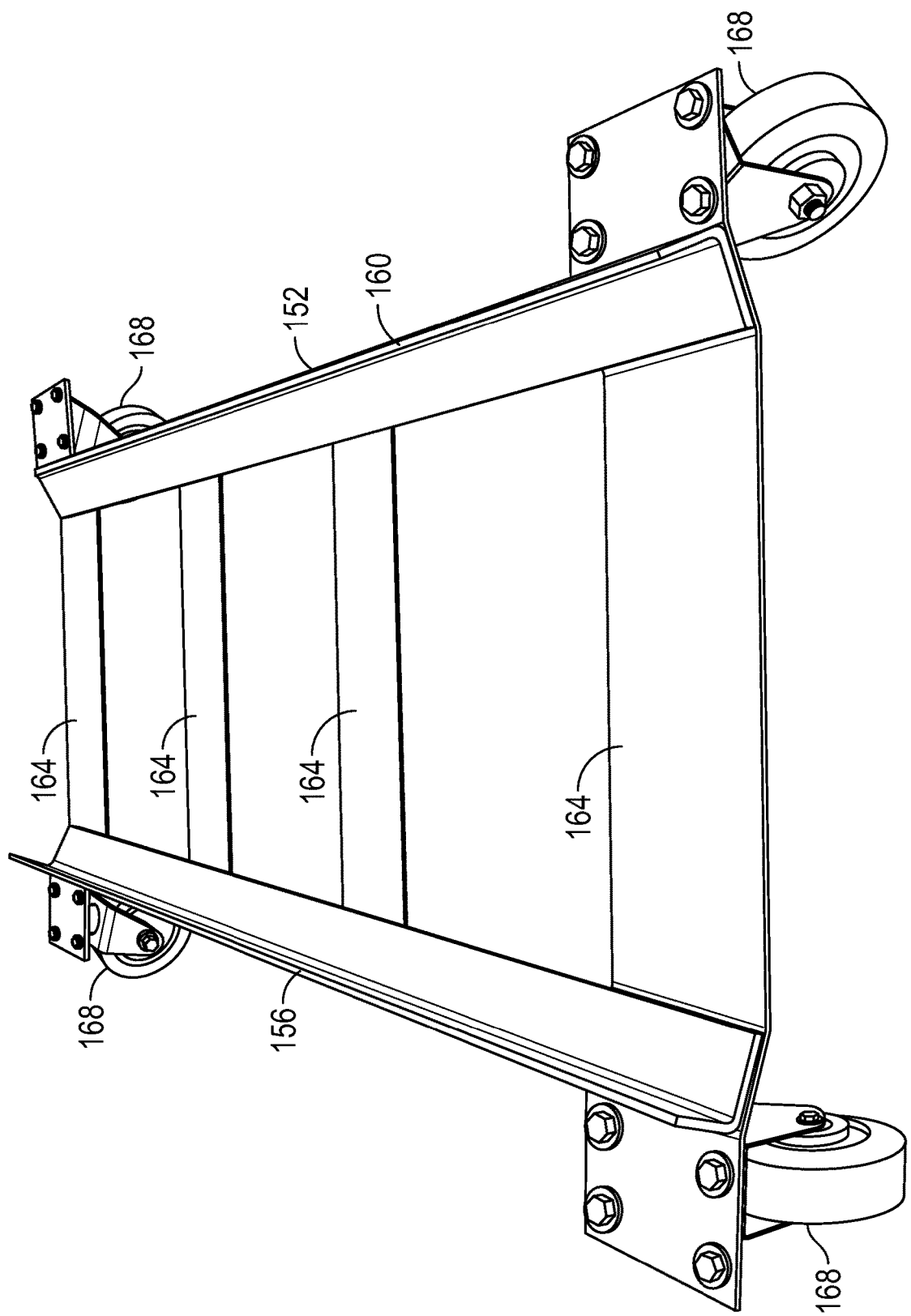
FIG. 18 is a front perspective view of the low profile dolly.

FIG. 18 is a front view of the low profile dolly 152. In this view, it can be seen that the rails 156, 160 are curved/angled to accept the curved shape of the bottom of an oil tank. The cross-members 164 may also be curved and/or concave to accept the curved shape of the bottom of an oil tank. The dolly 152 is low profile so it can slide under the oil tank, elongated winch member and hand crank. The dolly 152 supporting surfaces are close to the ground to make it easy to slide the oil tank onto the dolly 152 from the stair roller device after the oil tank is retrieved from a basement up the basement stairs. In addition, the low profile dolly 152 can easily be used to move the oil tank in the low clearance confines of many basements.

Figure 19:
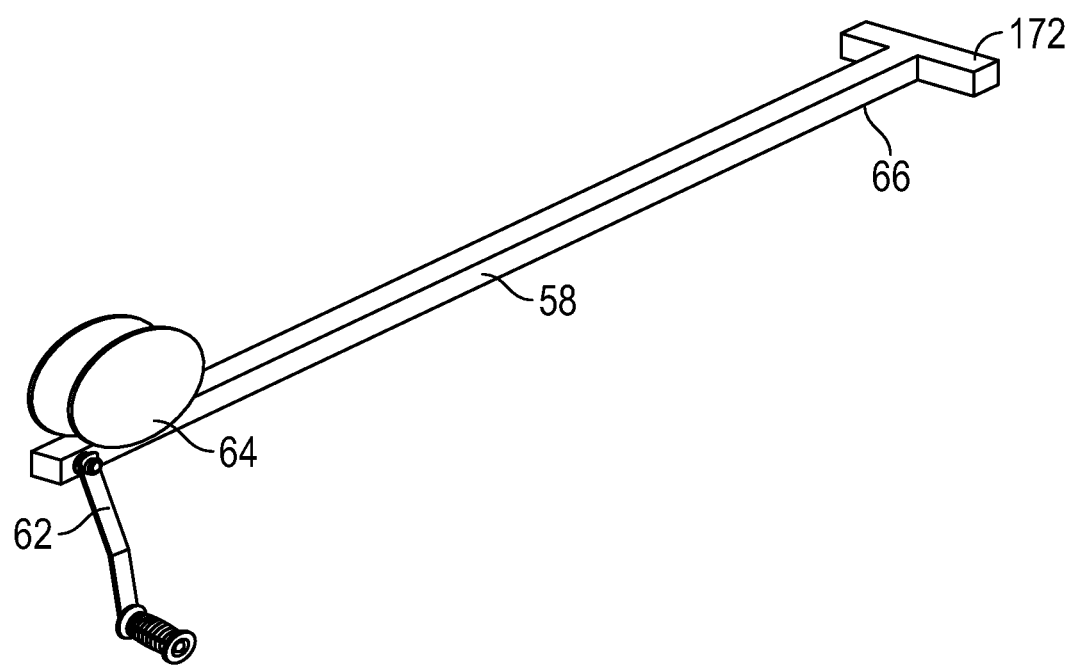
FIG. 19 is a perspective view of one embodiment of the elongated winch member.

FIG. 19 is a perspective view of one embodiment of the elongated winch member 58. The cross bar 172 is shown on the proximal end of the elongated winch member. In this orientation with the cross bar 172 in a horizontal orientation and the winch 62 in an upright orientation, if the cross bar 172 was in the triangular box 49, the cross bar 172 would prevent the elongated winch member 58 from being pulled out of the triangular box 49 due to the vertical slot 54 on the horizontal extending member 46. In order to remove the elongated winch member 58 from the triangular box 49, the winch member 58 and cross bar 172 would have to be rotated 90° so the cross bar can slide out of the vertical slot 54. The interaction of the slot 54 with the horizontal extending member 46 allows a user to move the winch 62 and horizontal extending member 46 up and down with respect to the slot 54 during the moving of the oil tank 74 up the stair roller device 10 and out of the basement.

Figure 20:
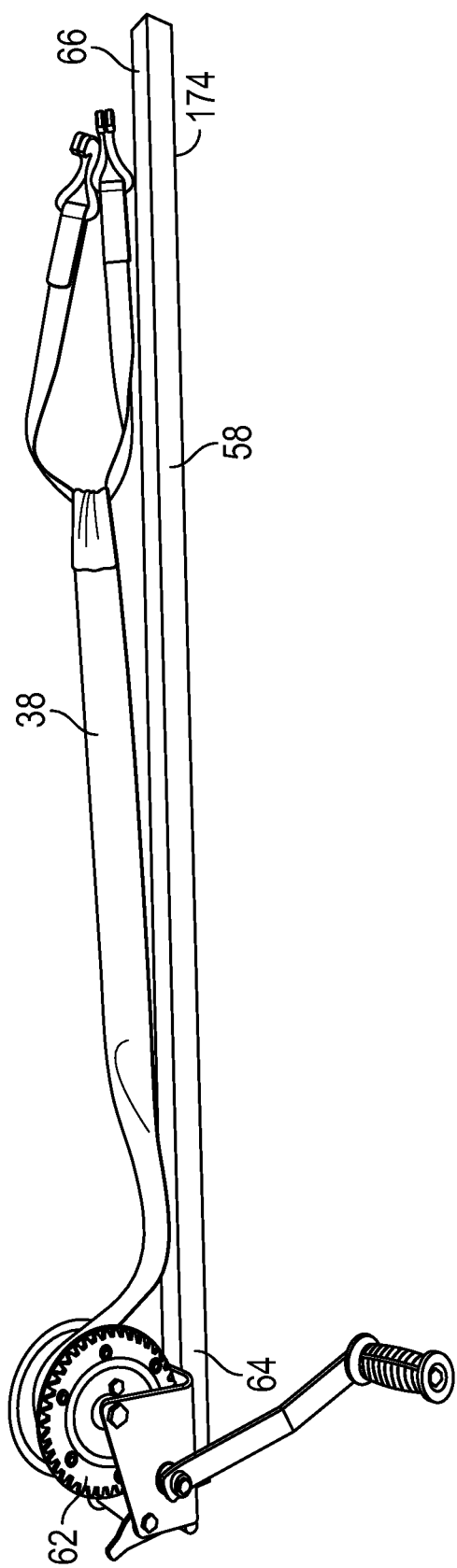
FIG. 20 is a top perspective view of another embodiment of the elongated winch member.

FIG. 20 shows another embodiment of the elongated winch member 58. In one embodiment, the elongated winch member 58 may comprise a hollow rectangular bar 174.

Figure 21:
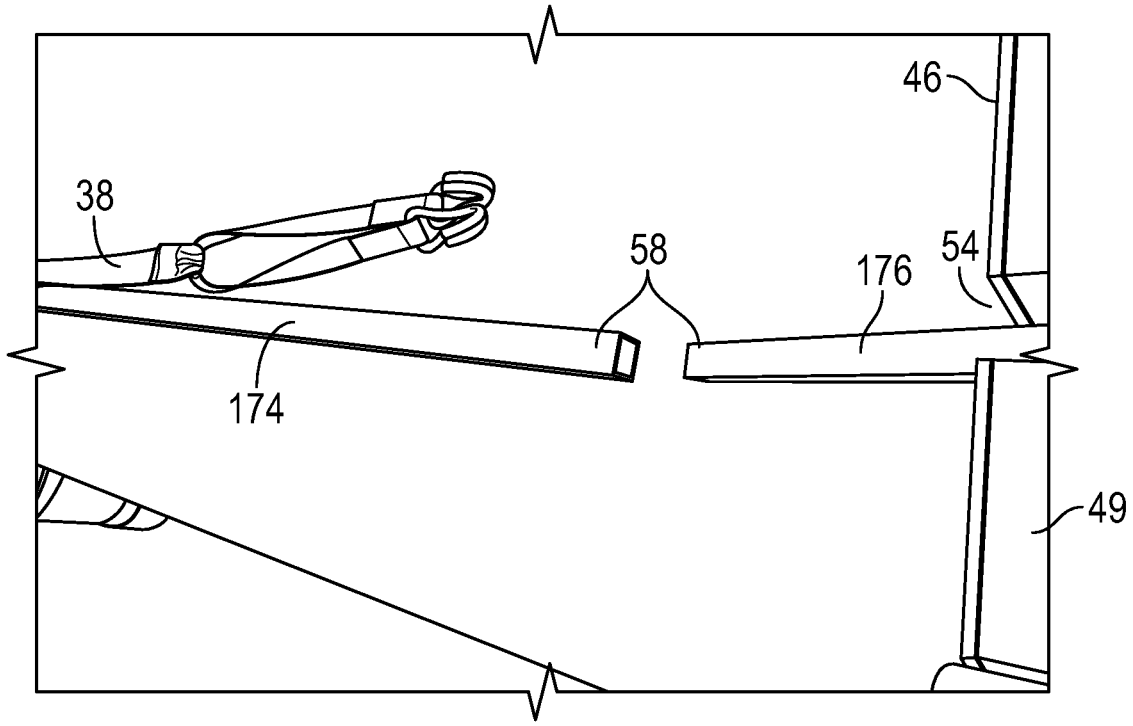
FIG. 21 is a top perspective view of the elongated winch member from FIG. 20 with a shank.

FIG. 21 shows the winch member 58 from FIG. 20. Also shown is the triangular box 49. The elongated winch member 58 may couple to a rectangular shank 176. The rectangular shank 176 may slide into the hollow rectangular bar 174. In one embodiment, the shank 176 is configured to be able to slide into the hollow rectangular bar 174 of the elongated winch member 58. The shank 176 extends out from the vertical slot 54. The shank 176 may be pinned inside the triangular box 49, such that the shank 176, and the hollow rectangular bar 174 can be rotated within the vertical slot 54. In one embodiment, the hollow rectangular bar 174 stays coupled to the shank 176 due to the weight of the oil tank pulling down on the strap 38, thus keeping the hollow rectangular bar 174 on the shank 176. Once the weight of the oil tank is no longer pulling down on the strap 38, the hollow rectangular bar 174 can easily be decoupled from the shank 176. In one embodiment the shank 176 may be a solid rectangular bar. In another embodiment, the hollow rectangular bar 174 and shank 176 may be made out of aluminum. In other embodiments, the shape of the hollow rectangular bar 174 and shank 176 may be circular, oval, or trapezoidal in cross-section, or any other suitable shape.

Figure 22:
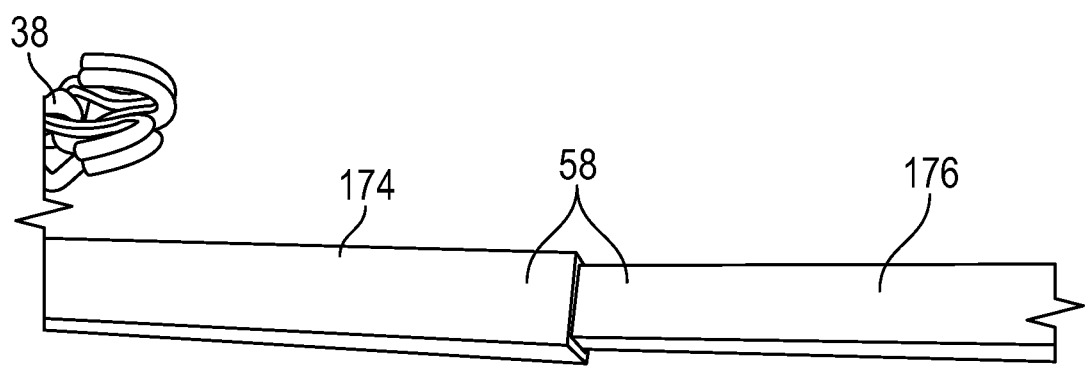
FIG. 22 is a top perspective view of the elongated winch member coupled to a shank.

FIG. 22 shows the elongated winch member 58 removeably coupled to the shank 176.

The disclosed stair roller device has many advantages. It has a low profile that does not extend very far from the stairs, thus allowing large objects to be pulled up stairs with low clearances. The stair roller device has a removable hand winch that can be removed to make removable of large objects, such as oil tanks, easier. The elongated winch member can be pivoted with respect to the vertical slot and triangular box to assist in maneuvering the oil tank out of the basement. The elongated winch member can be removed from the triangular box to allow the stair roller device to be easily stored and transported. The triangular box constrains the elongated winch member from being pulled back down the stair way due to the weight of the large object being lifted up the stairs. The stair roller device has wheels or rollers that allow large objects, such as oil tanks to be rolled up the roller device. The stair roller device has a hand winch and strap to allow large objects to be winched up the stair roller device. The optional kick stand helps users to support the oil tank when it is being removed from the basement. The kick plate allows a user to simply step on the kick plate to orient the kick stand in the proper position to support the oil tank, without the user having to bend down and use his or her hands to orient the kick stand under the oil tank. The kick stand has angled support plates to conform to the shape of an oil tank. The optional extender can be easily and quickly attached to a stair roller device to allow the use of the invention on longer stairs. The optional extender can be attached to a stair roller device without the need for tools. The low profile dolly is configured to support and move an oil tank. The low profile dolly is low to the ground to allow ease in loading the dolly with an oil tank. The elongated winch member 58 and shank 176 can rotate with respect to the pin, with the shank inside the vertical slot, this allows users to manipulate the stair roller device and oil tank while removing oil tank from a stairway. The elongated winch may comprises a hollow rectangular bar configured to slide onto a shank, and the hollow rectangular bar can easily decouple from the shank without the need for any tools, because the weight of the oil tank will keep the hollow rectangular bar and shank coupled together—until the oil tank is no longer pulling on the straps, where then the elongated winch member can be removed from the stair roller device, to make room for removing an oil tank from the stair roller device and stairs.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claim.

What is claimed is:

1. A stair roller device comprising:
a first rail with a top side and a bottom side;
a second rail with a top side and a bottom side, the second rail parallel to the first rail;
a top cross member fixedly attached to the first rail and second rail at or near the top of the first and second rails, the top cross member having a top side and a bottom side;
at least one other cross members fixedly attached to the first rail and second rail and below the top cross member;
a plurality of wheels on the top side of the first rail;
a plurality of wheels on the top side of the second rail;
a horizontal extending member extending at an acute angle from the bottom side of the top cross member, the horizontal extending member configured to abut against a structure at or near the top of a set basement stairs to temporarily hold the stair roller device on the basement stairs;
a rear wall fixedly attached to the horizontal extending member and the bottom side of the top cross member, the rear wall, horizontal extending member, and bottom side of the top cross member forming a triangular box;
a vertical slot in the horizontal extending member;
an elongated winch member with a winch at the distal end;
a shank pinned within the triangular box, such that the shank can rotate or pivot within the vertical slot, the shank configured to removeably couple to the elongated winch member at a proximal end of the elongated winch member;
  a strap in operable communication with the winch and configured to removeably attach to an oil tank; and
  wherein the stair roller device is configured to temporarily and securely lay on basement stairs such that a cumbersome item can be rolled up the stair roller device via the plurality of wheels up and out of a basement.

2. The stair roller device of claim 1, wherein the stair roller device has a low profile such that when moving an oil tank up basement stairs on the stair roller device, the oil tank will not impinge on the ceiling of the basement stairs.

3. The stair roller device of claim 1, wherein the stair roller device will have a height over the average slope of the stairs of no more than about 5 inches.

4. The stair roller device of claim 1, wherein the stair roller device will have a height over the average slope of the stairs of no more than about 3 and ½ inches.

5. The stair roller device of claim 1, wherein each wheel has an axis of rotation, and the axis of rotation is about orthogonal to the length of the first and second rails.

6. A stair roller device comprising:
a first rail with a top side and a bottom side;
a second rail with a top side and a bottom side, the second rail parallel to the first rail;
a top cross member fixedly attached to the first rail and second rail at or near the top of the first and second rails, the top cross member having a top side and a bottom side;
at least one other cross members fixedly attached to the first rail and second rail and below the top cross member;
a plurality of wheels on the top side of the first rail;
a plurality of wheels on the top side of the second rail;
a horizontal extending member extending at an acute angle from the bottom side of the top cross member, the horizontal extending member configured abut against a structure at or near the top of a set basement stairs to temporarily hold the stair roller device on the basement stairs;
a bottom cross member fixedly attached to the first rail and second rail at or near the bottom of the first and second rails, the bottom cross member having a top side and a bottom side;
an extender removeably attachable to the bottom cross member, the extender comprising:
an extender first rail with a top side and a bottom side;
an extender second rail with a top side and a bottom side, the extender second rail parallel to the extender first rail;
an extender top cross member fixedly attached to the extender first rail and extender second rail at or near the top of the extender first and extender second rails, the extender top cross member having a top side and a bottom side;
at least one other extender cross member fixedly attached to the extender first rail and extender second rail and below the extender top cross member;
a plurality of wheels on the top side of the extender first rail,
a plurality of wheels on the top side of the extender second rail,
a connector plate fixedly attached to the extender top cross-member;
at least one fastener located on the front of the connector plate, the fastener configured to extend out of the back of the connector plate;
a top member extending generally orthogonally from the top of the back of the connector plate;
a down member extending down from the rear of the top member;
a slot formed by the connector plate, top member, and down member, the slot configured to accept the bottom cross member;
wherein the stair roller device is configured to temporarily and securely lay on basement stairs such that a cumbersome item can be rolled up the stair roller device via the plurality of wheels up and out of a basement; and
wherein the connector plate is configured to attach to the bottom cross-member of a stair roller device; the fastener configured to act as a stop to prevent the bottom cross-member from sliding out from the slot.

7. A stair roller system comprising:
a first rail with a top side and a bottom side;
a second rail with a top side and a bottom side, the second rail parallel to the first rail;

a top cross member fixedly attached to the first rail and second rail at or near the top of the first and second rails, the top cross member having a top side and a bottom side;
at least one other cross members fixedly attached to the first rail and second rail and below the top cross member;
a plurality of wheels on the top side of the first rail;
a plurality of wheels on the top side of the second rail;
a horizontal extending member extending at an acute angle from the bottom side of the top cross member, the horizontal extending member configured to abut against a structure at or near the top of a set basement stairs to temporarily hold the stair roller device on the basement stairs;
a rear wall fixedly attached to the horizontal extending member and the bottom side of the top cross member, the rear wall, horizontal extending member, and bottom side of the top cross member forming a triangular box;
a vertical slot in the horizontal extending member;
an elongated winch member with a winch at the distal end;
a shank pinned within the triangular box, such that the shank can rotate or pivot within the vertical slot, the shank configured to removeably couple to the elongated winch member at a proximal end of the elongated winch member;
a strap in operable communication with the winch and configured to removeably attach to an oil tank; and
wherein the stair roller device is configured to temporarily and securely lay on basement stairs such that a cumbersome item can be rolled up the stair roller device via the plurality of wheels up and out of a basement.

8. The stair roller system of claim 7, wherein each wheel has an axis of rotation, and the axis of rotation is about orthogonal to the length of the first and second rails.

9. The stair roller system of claim 7, further comprising:
a kick stand, the kick stand comprising:
a base;
a first adjustable support member on a first end of the base;
a second adjustable support member at a second end of the base;
a first angled support plate attached to a distal end of the first adjustable support member;
a second angled support plate attached to a distal end of the second adjustable support member;
a kick plate fixedly attached to the base, the kick plate at an angle of about 90° with respect to the first and second adjustable support members;
wherein the kick stand is configured to be laid near and/or below where an oil tank will be removed from a basement stair, with the kick plate away from where the oil tank will be removed from the basement stair, with the first and second adjustable support members abutting the ground, and the kick plate generally pointing up in the air, and the kick plate can be stepped on pushed to the ground such that the kick stand rotates and first and second adjustable support members rotate to vertical orientations such that the first angled support plate and the second angled support plate are positioned to receive and support the oil tank.

10. The stair roller system of claim 7, further comprising:
a low profile dolly, the low profile dolly comprising:
a dolly first side rail, the dolly first side rail curved such that it is configured to accept the curved shape of the bottom of an oil tank;
a dolly second side rail, the dolly second side rail curved such that it is configured to accept the curved shape of the bottom of an oil tank;
a plurality of a dolly cross-members attached to the dolly first side rail and to the dolly second side rail;
a plurality of dolly wheels located on the bottom side of the low profile dolly.

11. The stair roller system of claim 10, wherein the low profile dolly is no higher than about 7 inches.

12. The stair roller system of claim 7, further comprising:
a bottom cross member fixedly attached to the first rail and second rail at or near the bottom of the first and second rails, the bottom cross member having a top side and a bottom side;
an extender removeably attachable to the bottom cross member, the extender comprising:
an extender first rail with a top side and a bottom side;
an extender second rail with a top side and a bottom side, the extender second rail parallel to the extender first rail;
an extender top cross member fixedly attached to the extender first rail and extender second rail at or near the top of the extender first and extender second rails, the extender top cross member having a top side and a bottom side;
at least one other extender cross member fixedly attached to the extender first rail and extender second rail and below the extender top cross member;
a plurality of extender wheels on the top side of the extender first rail;
a plurality of extender wheels on the top side of the extender second rail;
a connector plate fixedly attached to the extender top cross-member;
at least one fastener located on the front of the connector plate, the fastener configured to extend out of the back of the connector plate;
a top member extending generally orthogonally from the top of the back of the connector plate;
a down member extending down from the rear of the top member;
a slot formed by the connector plate, top member, and down member, the slot configured to accept the bottom cross member;
wherein the connector plate is configured to attach to the bottom cross-member of a stair roller device; the fastener configured to act as a stop to prevent the bottom cross-member from sliding out from the slot.

13. The stair roller system of claim 12, wherein each extender wheel has an axis of rotation, and the axis of rotation is about orthogonal to the length of the extender first rail and extender second rail.

* * * * *